US012377761B2

(12) United States Patent
Lim et al.

(10) Patent No.: US 12,377,761 B2
(45) Date of Patent: Aug. 5, 2025

(54) WALK-IN SEAT LOCKING DEVICE FOR VEHICLE

(71) Applicants: Hyundai Motor Company, Seoul (KR); Kia Corporation, Seoul (KR); Das Co., Ltd, Gyeongju-si (KR)

(72) Inventors: Deok Soo Lim, Hwaseong-si (KR); Sang Do Park, Suwon-si (KR); Ho Suk Jung, Hwaseong-si (KR); Sang Hark Lee, Incheon (KR); Chan Ho Jung, Gunpo-si (KR); Sang Soo Lee, Hwaseong-si (KR); Dong Geon Lee, Suwon-si (KR); Seung Heon Ryu, Yongin-si (KR)

(73) Assignees: Hyundai Motor Company, Seoul (KR); Kia Corporation, Seoul (KR); DAS CO., LTD, Gyeongju-si (KR)

( * ) Notice: Subject to any disclaimer, the term of this patent is extended or adjusted under 35 U.S.C. 154(b) by 160 days.

(21) Appl. No.: 18/310,630

(22) Filed: May 2, 2023

(65) Prior Publication Data
US 2024/0174136 A1    May 30, 2024

(30) Foreign Application Priority Data

Nov. 24, 2022  (KR) ........................ 10-2022-0158823

(51) Int. Cl.
| | |
|---|---|
| *B60N 2/12* | (2006.01) |
| *B60N 2/02* | (2006.01) |
| *B60N 2/14* | (2006.01) |
| *B60N 2/18* | (2006.01) |
| *B60N 2/90* | (2018.01) |

(52) U.S. Cl.
CPC ............. *B60N 2/12* (2013.01); *B60N 2/0244* (2013.01); *B60N 2/146* (2013.01); *B60N 2/185* (2013.01); *B60N 2/938* (2018.02); *B60N 2/0256* (2023.08); *B60N 2002/952* (2018.02)

(58) Field of Classification Search
CPC . B60N 2/12; B60N 2/14; B60N 2/146; B60N 2/185
See application file for complete search history.

(56) References Cited

U.S. PATENT DOCUMENTS

| | | | | |
|---|---|---|---|---|
| 11,845,365 | B2* | 12/2023 | Hwang | ................... B60N 2/943 |
| 12,145,481 | B2* | 11/2024 | Lee | ........................ B60N 2/123 |
| 2019/0225120 | A1* | 7/2019 | Kish | ......................... B60N 2/43 |
| 2020/0215935 | A1* | 7/2020 | Maekawa | ................ B60N 2/12 |
| 2020/0391621 | A1* | 12/2020 | Jung | ....................... B60N 2/045 |
| 2022/0332224 | A1* | 10/2022 | Lee | ....................... B60N 2/2358 |
| 2023/0049867 | A1* | 2/2023 | Jung | .................. B60N 2/02246 |

* cited by examiner

*Primary Examiner* — Timothy J Brindley
(74) *Attorney, Agent, or Firm* — Slater Matsil, LLP (57) ABSTRACT

An embodiment walk-in seat locking device for a vehicle includes a rear link including a first sector gear, the rear link having a first end portion hinge-fastened to a rear portion of a seat cushion frame and a second end portion hinge-fastened to a rear portion of a seat rail, a locking link including a second sector gear engageable with the first sector gear, wherein the second sector gear is on a rear portion of the locking link and is hinge-fastened to the seat cushion frame, a lever having a first end portion to which a cable is connected and a second end portion hinge-fastened to the seat cushion frame, a first locking cam having a first end portion coaxially connected to the lever, and a second locking cam having a first end portion coaxially connected to the lever and the first locking cam.

18 Claims, 8 Drawing Sheets

WALK-IN SEAT LOCKING DEVICE FOR VEHICLE

CROSS-REFERENCE TO RELATED APPLICATIONS

This application claims the benefit of Korean Patent Application No. 10-2022-0158823, filed on Nov. 24, 2022, which application is hereby incorporated herein by reference.

TECHNICAL FIELD

The present disclosure relates generally to a walk-in seat locking device for a vehicle.

BACKGROUND

In general, one or two rows of seats are disposed in the interior of automobiles, and three or more rows of seats are disposed in the interior of vans, sport utility vehicles (SUVs), etc., but seats may be disposed in a variety of other arrangements.

In particular, as a second-row seat for obtaining an entrance and exit passage for a third row of seats, a tilting walk-in seat having a structure allowing the seatback thereof to be pivoted forwards and erected upright while allowing the seat cushion to be tilted has been used.

Figure 1A:
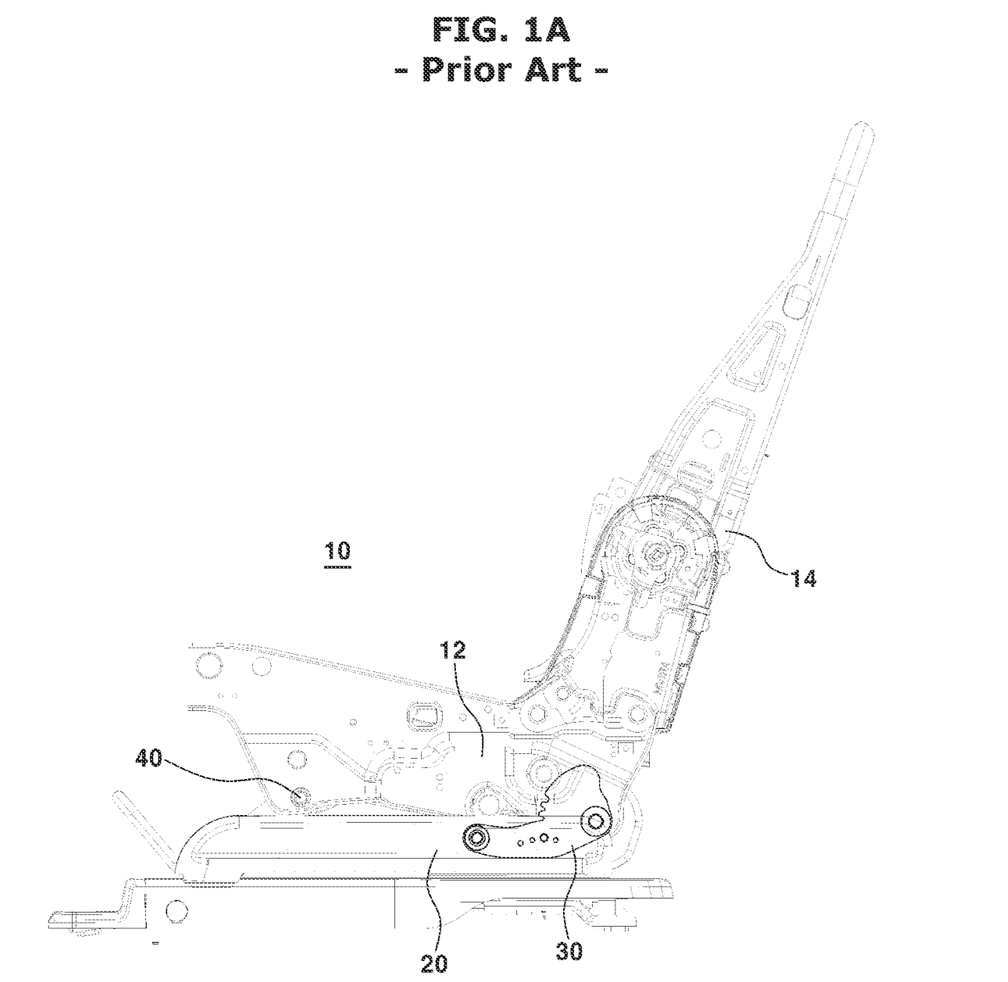
FIGS. 1A and 1B are schematic diagrams illustrating positions of a walk-in seat of the related art before and after a tilting operation.
Figure 1B:
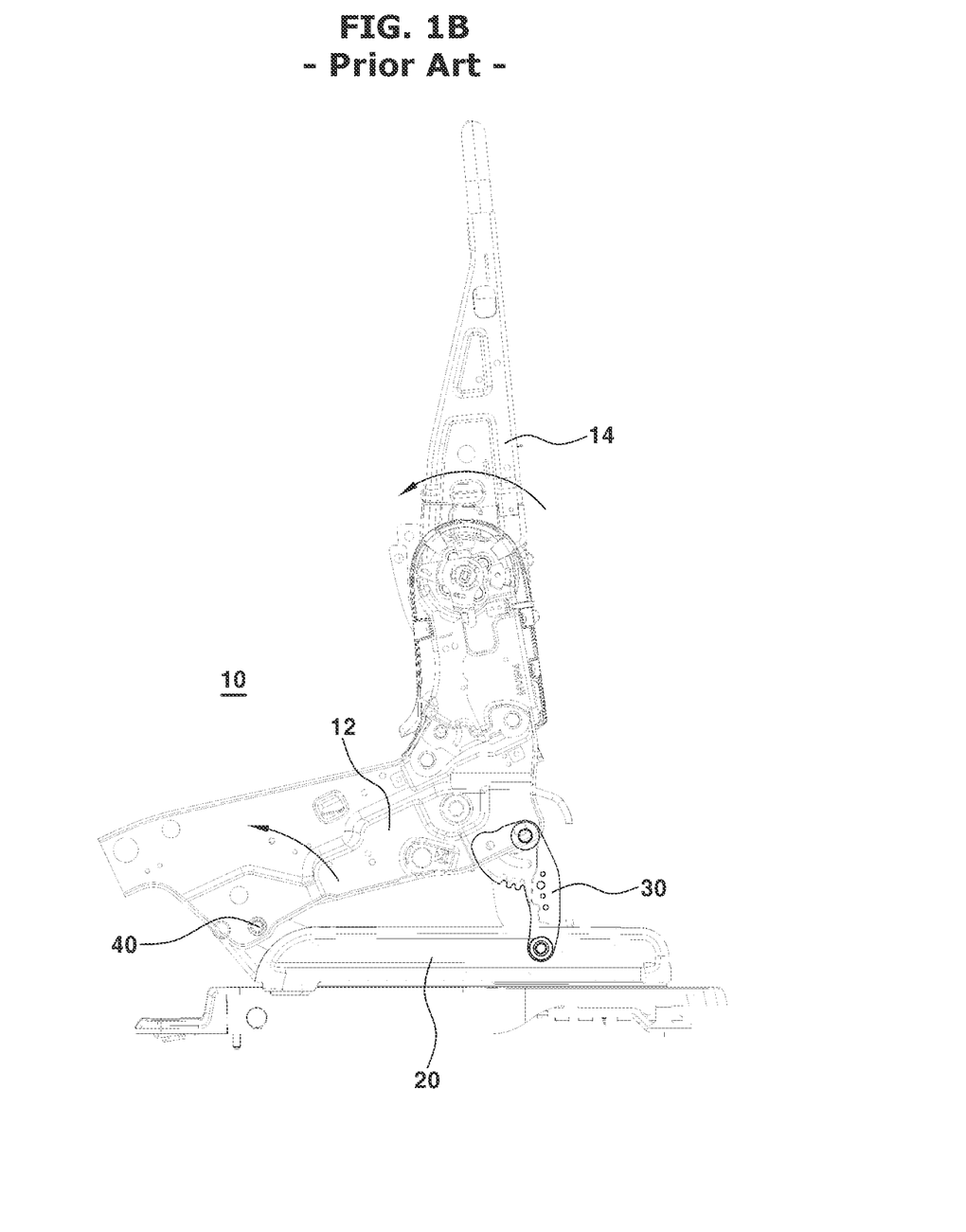

In the accompanying drawings, FIGS. 1A and 1B are schematic diagrams illustrating positions of a walk-in seat of the related art before and after operation.

As illustrated in FIGS. 1A and 1B, the rear end portions of a seat cushion frame 12 and a seat rail 20 of a walk-in seat 10 of the related art are connected with a rear link 30, whereas the front end portions of the seat cushion frame 12 and the seat rail 20 are connected with a hinge 40.

When the rear link 30 is arranged in the forward-backward direction and locked by a separate locking device (not shown), the seat cushion frame 12 and a seatback frame 14 are arranged in a position in which a passenger may sit in the seat.

In contrast, in a position in which the locking device is unlocked from the rear link 30, when the seatback frame 14 is pivoted forwards as illustrated in FIG. 1B, the rear link 30 pushes the rear end portion of the seat cushion frame 12 upwards while being pivoted in a vertical upright direction. Consequently, at the same time that the seatback frame 14 is erected upright, the seat cushion frame 12 pivots about the hinge 40 so as to be tilted to a predetermined angle.

Thus, since the seat cushion frame 12 is tilted at the same time that the seatback frame 14 is erected upright, an entrance and exit passage may be provided to a third row of seats.

However, the walk-in seat of the related art has the following problems.

In a situation in which the seat cushion frame 12 and the seatback frame 14 are arranged in a position in which a passenger may sit in the seat and the rear link 30 is locked by the locking device, when external force (e.g., an impact from a rear-end collision) is applied to the locking device, the locking device may be unlocked from the rear link 30.

Furthermore, in the case that the locking device is unlocked from the rear link 30, the seatback frame 14 is erected upright and, at the same time, the seat cushion frame 12 pivots about the hinge 40, a passenger sitting on the seat may be suddenly forced forwards and thus may be injured.

The above information disclosed in this background section is only for enhancement of understanding of the background of embodiments of the disclosure and accordingly it may include information that does not form the prior art that is already known to a person of ordinary skill in the art.

SUMMARY

The present disclosure relates generally to a walk-in seat locking device for a vehicle. Particular embodiments relate to a walk-in seat locking device for a vehicle in which the device is able to prevent the walk-in seat from being unlocked by external force.

Embodiments of the present disclosure can solve problems associated with the related art, and an embodiment of the present disclosure provides a walk-in seat locking device for a vehicle configured such that a rear link connected to a seat cushion frame and a seat rail may be double locked, thereby preventing release of a locked state due to external force including an impact from a rear-end collision.

One embodiment of the present disclosure provides a walk-in seat locking device for a vehicle, the device including a rear link having a structure including a first sector gear, with one end portion thereof being hinge-fastened to a rear portion of a seat cushion frame and the other end thereof being hinge-fastened to a rear portion of a seat rail, a locking link including a second sector gear engageable with the first sector gear, the second sector gear being provided on a rear portion of the locking link and hinge-fastened to the seat cushion frame, a lever having one end portion to which a cable is connected and the other end portion hinge-fastened to the seat cushion frame, a first locking cam having one end portion coaxially connected to the lever and including a first locking end provided on the other end portion to restrain the locking link, and a second locking cam having one end portion coaxially connected to the lever and the first locking cam and including a second locking end on the other end portion to restrain the locking link. The first locking cam may include a pivot restraining pin on the first locking end, and the second locking cam includes a pivot restraining slot in the second locking end, the slot being configured such that the pin is inserted thereinto.

The rear link may include a guide slot to guide a tilting route of the seat cushion frame, and the seat cushion frame may include a guide pin configured to be slidably inserted into the guide slot.

The walk-in seat locking device may further include a spiral spring having one end portion connected to a predetermined position of the rear link and the other end portion connected to the seat cushion frame in order to provide elastic restoring force to tilt the seat cushion frame with respect to the rear link.

The locking link may include a reclining end protruding from a front intermediate portion thereof, and the first locking end of the first locking cam may contact with the reclining end to pivot the locking link in an unlocking direction.

The locking link may include a locking protrusion protruding from a front bottom end portion thereof, and the first locking end of the first locking cam may contact with the locking protrusion to push the locking link in a locking direction.

The locking link may include a locking lug protruding from an outer surface thereof, and the second locking end of the second locking cam contacts with the locking lug to push the locking link in a locking direction.

The walk-in seat locking device may further include a spring hook provided on the front portion of the second locking cam and a second return spring connected to the spring hook and a predetermined position of the seat cushion frame to provide the second locking cam with elastic restoring force in a locking direction. The walk-in seat locking device may further include a first return spring connected to an upper end portion of the lever and a predetermined position of the seat cushion frame to provide the lever with elastic restoring force in a locking direction.

The walk-in seat locking device may further include an actuator driven to pull the cable in an unlocking direction and a controller configured to apply a driving signal to the actuator in response to a switch being manipulated.

The pin provided on the first locking end of the first locking cam and the slot provided in the second locking end of the second locking cam may restrain pivoting of the first locking cam in an unlocking direction.

When the first locking cam is pivoted in the unlocking direction by external force including an impact from a rear-end collision, the pivot restraining pin provided on the first locking end of the first locking cam may move from a bottom of the pivot restraining slot provided on the second locking end of the second locking cam to be caught at the top of the pivot restraining slot.

When the first locking cam is pivoted in the unlocking direction by external force including an impact from a rear-end collision, the second locking cam may be prevented from pivoting in the unlocking direction by elastic restoring force of the second return spring connected to a spring hook provided on a front portion of the second locking cam and a predetermined position of the seat cushion frame.

The walk-in seat locking device for a vehicle according to embodiments of the present disclosure provides the following effects.

First, the rear link among the components of the locking device for locking a walk-in seat in a position in which a passenger may sit in the seat may be double-locked using the first locking cam, the second locking cam, etc., thereby preventing release of the locked state due to external force including an impact from a rear-end collision.

Second, since release of the locked state of the walk-in seat locking device may be prevented even in the case that external force including an impact from a rear-end collision is applied to the walk-in seat locking device, it is possible to prevent release of the locked state of the locking device due to external force including an impact from a rear-end collision from injuring a passenger seated in the walk-in seat.

BRIEF DESCRIPTION OF THE DRAWINGS

The above and other features of embodiments of the present disclosure will now be described in detail with reference to certain exemplary examples thereof illustrated in the accompanying drawings which are given hereinbelow by way of illustration only, and thus are not limitative of the present disclosure, and wherein.

DETAILED DESCRIPTION OF ILLUSTRATIVE EMBODIMENTS

Hereinafter, exemplary embodiments of the present disclosure will be described in detail with reference to the accompanying drawings.

Figure 2:
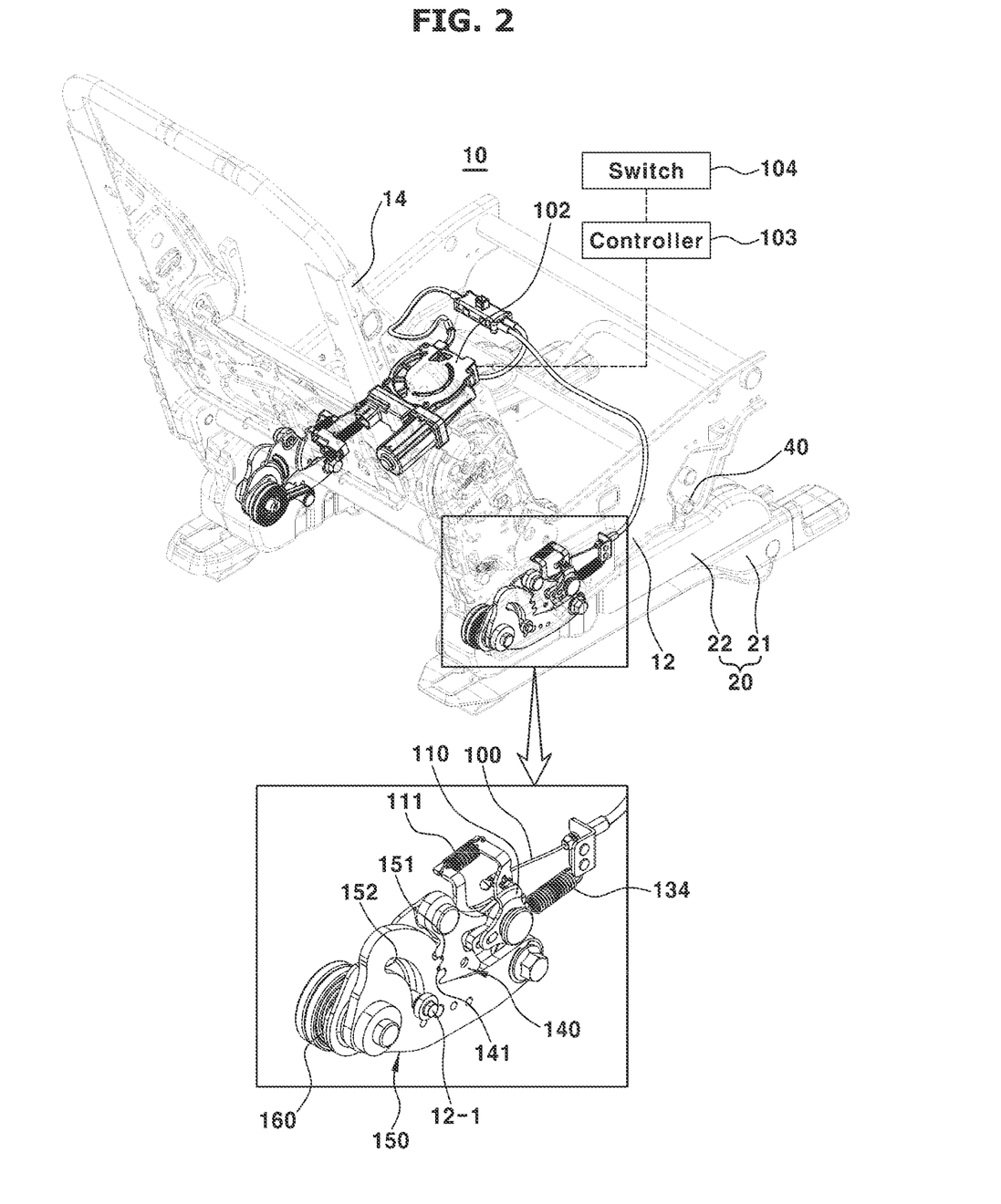
FIG. 2 is a perspective view illustrating a walk-in seat locking device for a vehicle according to embodiments of the present disclosure mounted on a walk-in seat.
Figure 3:
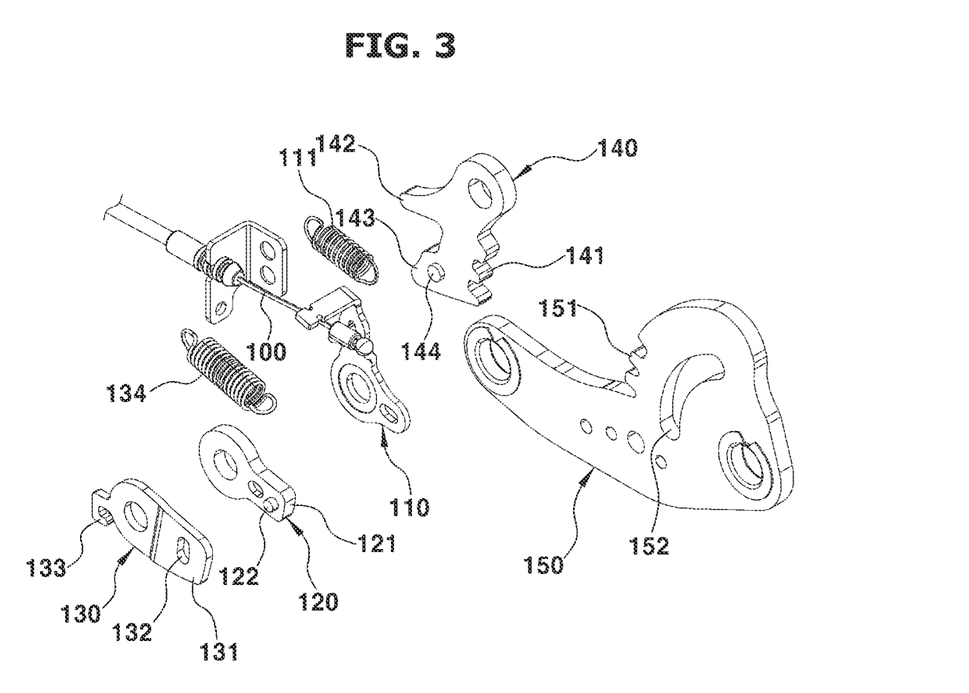
FIG. 3 is an exploded perspective view illustrating the walk-in seat locking device for a vehicle according to embodiments of the present disclosure.
Figure 4:
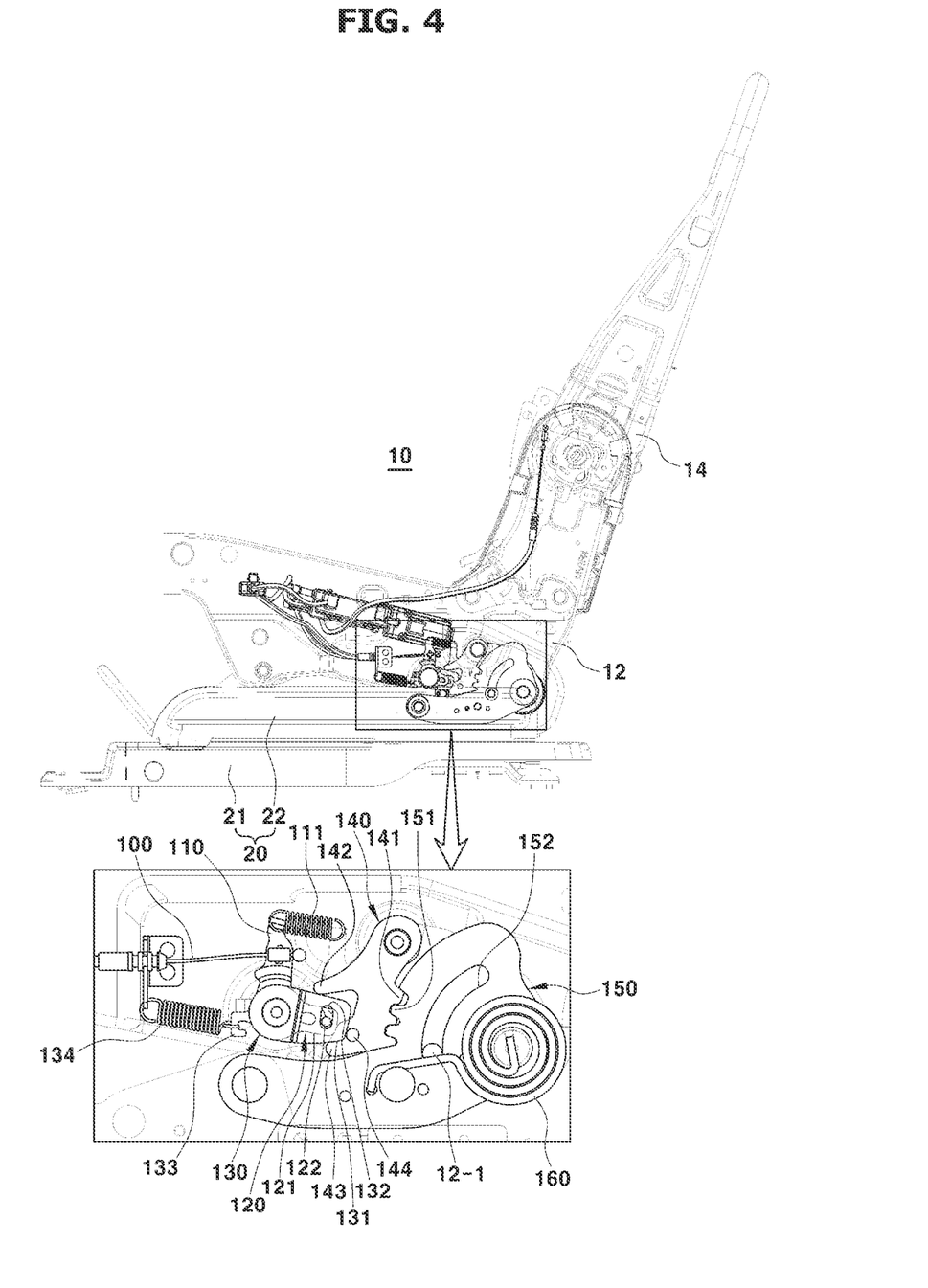
FIG. 4 is a side view illustrating a locking position of the walk-in seat locking device for a vehicle according to embodiments of the present disclosure.

In the accompanying drawings, FIG. 2 is a perspective view illustrating a walk-in seat locking device for a vehicle according to embodiments of the present disclosure mounted on a walk-in seat, FIG. 3 is an exploded perspective view illustrating the walk-in seat locking device for a vehicle according to embodiments of the present disclosure, and FIG. 4 is a side view illustrating a locking position of the walk-in seat locking device for a vehicle according to embodiments of the present disclosure.

As illustrated in FIGS. 2 to 4, a rear link 150 of components of the locking device is connected to a seat cushion frame 12 and a seat rail 20 of a walk-in seat 10 with a hinge.

The rear link 150 has a structure in which a first sector gear 151 is provided on one surface portion, with one end portion being hinge-fastened to the rear portion of the seat cushion frame 12 and the other end portion being hinge-fastened to the rear portion of the seat rail 20.

The seat rail 20 includes a fixed rail 21 mounted on a floor panel to adjust the position of the walk-in seat 10 in the forward-backward direction and a movable rail 22 fastened to the fixed rail 21 so as to be movable in the forward-backward direction. Substantially, the rear end portion of the rear link 150 is hinge-fastened to the rear portion of the movable rail 22.

In addition, a guide slot 152 is formed in an inner portion of the first sector gear 151 of the rear link 150 to guide a tilting route of the seat cushion frame 12. A guide pin 12-1 protrudes from the seat cushion frame 12 to be slidably inserted into the guide slot 152.

Here, a spiral spring 160 wound a predetermined number of turns may be used to provide elastic restoring force to tilt the seat cushion frame 12 with respect to the rear link 150.

More specifically, one end portion of the spiral spring 160 is connected to a predetermined position of the rear link 150, and the other end portion of the spiral spring 160 is connected to a predetermined position of the seat cushion frame 12. With this configuration, the spiral spring 160 provides elastic restoring force in a direction in which the seat cushion frame 12 is tilted with respect to the rear link 150.

The top end portion of a locking link 140 of the locking device is hinge-fastened to the seat cushion frame 12. A second sector gear 141 engageable with the first sector gear 151 of the rear link 150 is formed on the rear end portion of the locking link 140.

In addition, a reclining end 142 protrudes from a front intermediate portion of the locking link 140, and a first locking end 121 of a first locking cam 120 is configured to contact with the reclining end 142 to pivot the locking link 140 in an unlocking direction.

In addition, a locking protrusion 143 protrudes from the front bottom end portion of the locking link 140, and the first locking end 121 of the first locking cam 120 is configured to contact with the locking protrusion 143 to push the locking link 140 in a locking direction.

In particular, a locking lug 144 protrudes from a predetermined position on the outer surface of the locking link 140, and a second locking end 131 of a second locking cam 130 is configured to contact with the locking lug 144 to push the locking link 140 in the locking direction.

The bottom end portion of a lever 110 is hinge-fastened to the seat cushion frame 12, and a cable 100 is connected to the upper end portion of the lever 110 to pull the lever 110 in the unlocking direction.

Particularly, an actuator 102 configured to pull the cable 100 in the unlocking direction is mounted in a predetermined bottom position of the seat cushion frame 12. In addition, a controller 103 configured to apply a driving signal to the actuator 102 in response to a switch 104 being manipulated by a user may be mounted in a predetermined bottom position.

In addition, a first return spring 111 is connected to the upper end portion of the lever 110 and the predetermined position of the seat cushion frame 12 to provide the lever 110 with elastic restoring force in the locking direction.

Thus, when the lever 110 is pulled by the cable 100, the first return spring 111 is stretched. In contrast, when the pulling force applied to the lever 110 through the cable 100 is removed, the lever 110 may be pivoted to the original position in the locking position by elastic restoring force of the first return spring 111.

The first locking cam 120 is configured such that one end portion thereof is coaxially connected to a hinge shaft of the lever 110 so that the first locking cam 120 may pivot together with the lever 110. In addition, the first locking end 121 configured to restrain the locking link 140 protrudes from the other end of the first locking cam 120.

The second locking cam 130 is disposed on the outer surface of the first locking cam 120 in an overlapping manner. One end portion of the second locking cam 130 is axially connected to the lever 110 and the first locking cam 120 such that the second locking cam 130 is freely pivotable. The second locking cam 130 has the second locking end 131 protruding from the other end portion to restrain the locking link 140.

In particular, a pivot restraining pin 122 protrudes from the outer surface of the first locking end 121 of the first locking cam 120. A pivot restraining slot 132 is formed in the second locking end 131 of the second locking cam 130 such that the pivot restraining pin 122 is slidably inserted into the pivot restraining slot 132.

In addition, a spring hook 133 is formed on the front portion of the second locking cam 130. A second return spring 134 is connected to the spring hook 133 and a predetermined position of the seat cushion frame 12 to provide the second locking cam 130 with elastic restoring force in the locking direction.

Thus, when the lever 110 is pulled by the cable 100 and, at the same time, the second locking cam 130 is pivoted in the unlocking direction, the second return spring 134 is stretched. In contrast, when pulling force to the lever 110 is removed, the second locking cam 130 may be pivoted to the original position in the locking direction by elastic restoring force of the second return spring 134.

Hereinafter, operation flow of the walk-in seat locking device according to embodiments of the present disclosure having the above-described configuration will be described as follows.

Referring to FIG. 4, in a situation in which the lever 110 is in the original position, i.e., the locking position, while not being pulled by the cable 100, the second sector gear 141 of the locking link 140 is engaged with the first sector gear 151 of the rear link 150. Consequently, the rear link 150 is restrained from pivoting while remaining in the original position, i.e., the locking position.

Here, the guide pin 12-1 of the seat cushion frame 12 is placed in the bottom of the guide slot 152 of the rear link 150. The spiral spring 160 is wound in a shape similar to that of concentric circles to maintain elastic restoring force for tilting the seat cushion frame 12 with respect to the rear link 150.

In addition, the first locking end 121 of the first locking cam 120 pushes the locking link 140 toward the rear link 150 while contacting with the locking protrusion 143 of the locking link 140, and the second locking end 131 of the second locking cam 130 pushes the locking link 140 toward the rear link 150 while contacting with the locking lug 144 of the locking link 140. Consequently, engagement between the second sector gear 141 of the locking link 140 and the first sector gear 151 of the rear link 150 may be stably maintained.

Figure 5:
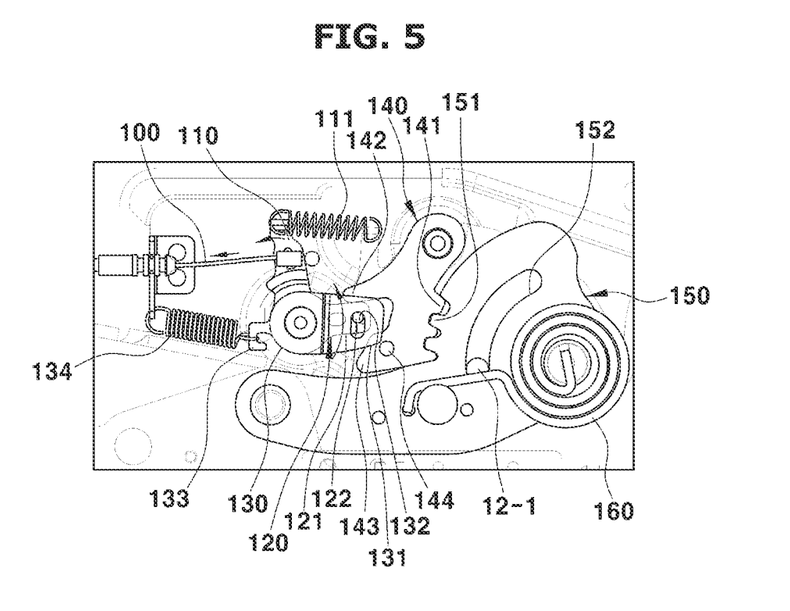
FIGS. 5 and 6 are side views illustrating an unlocking operation of the walk-in seat locking device for a vehicle according to embodiments of the present disclosure.
Figure 6:
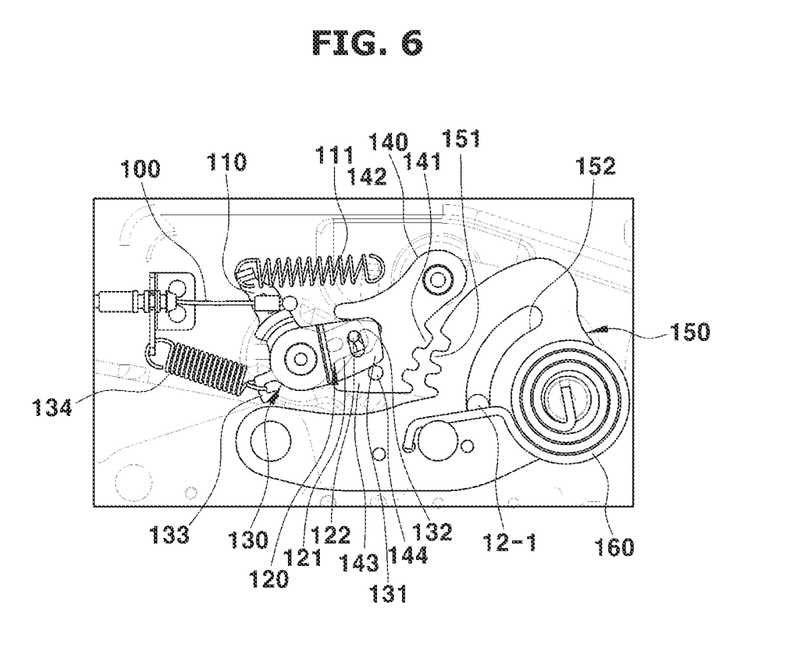
Figure 7:
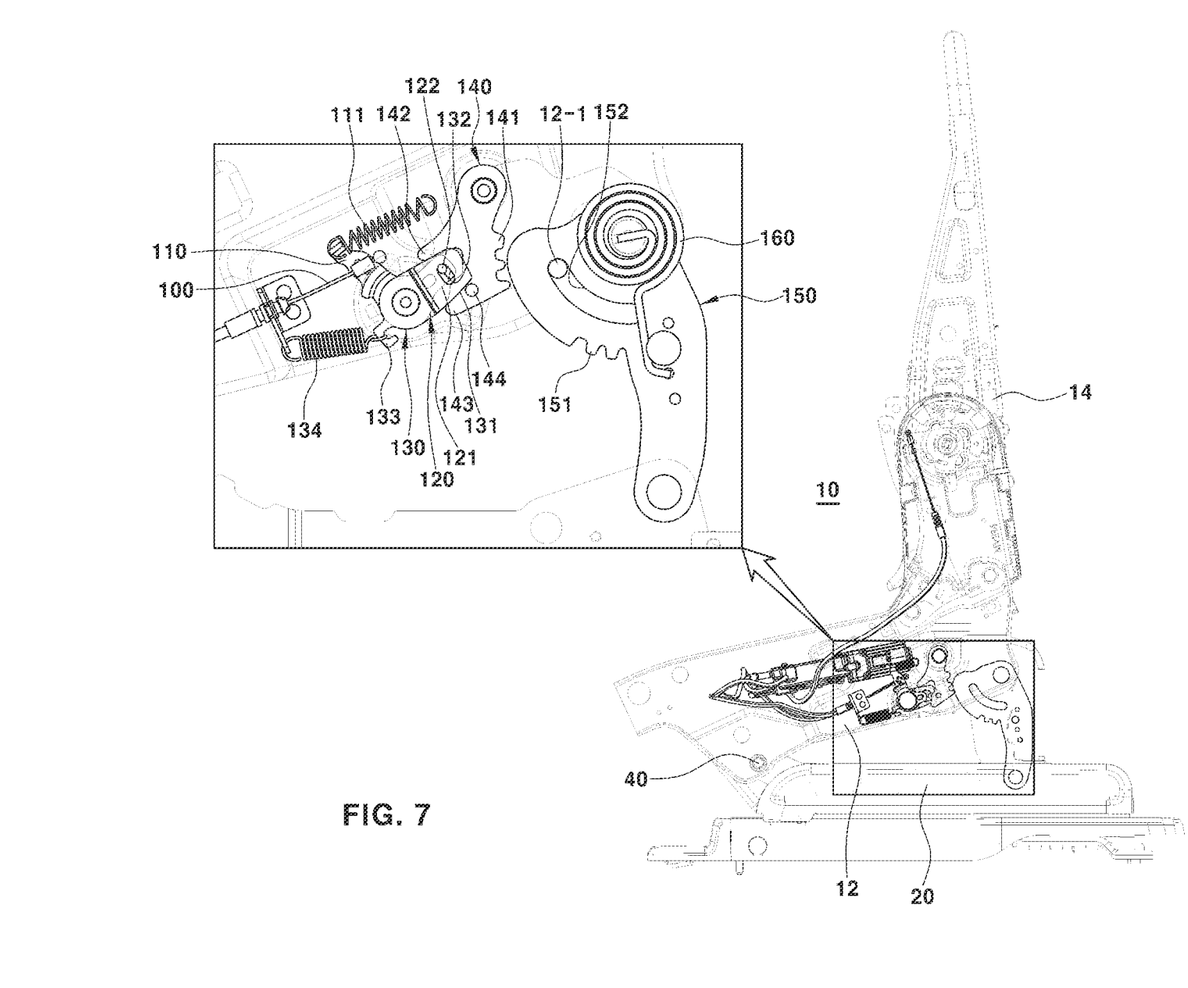
FIG. 7 is a side view illustrating a position in which the seat cushion frame is tilted in response to pivoting of the rear link after the walk-in seat locking device for a vehicle according to embodiments of the present disclosure is unlocked.

FIGS. 5 and 6 are side views illustrating an unlocking operation of the walk-in seat locking device for a vehicle according to embodiments of the present disclosure, and FIG. 7 is a side view illustrating a position in which the seat cushion frame 12 is tilted in response to pivoting of the rear link 150 after the walk-in seat locking device for a vehicle according to embodiments of the present disclosure is unlocked.

As illustrated in FIGS. 5 and 6, when the lever 110 pivots while being pulled in the unlocking direction by the cable 100, the first locking cam 120 connected to the same hinge shaft as the lever 110 in a simultaneously pivotable manner is also pivoted in the unlocking direction together with the lever 110.

More specifically, when the actuator 102 is driven in response to a driving signal of the controller 103 in response to the switch 104 being manipulated by the user and the cable 100 is pulled, the lever 110 connected to the cable 100 is pivoted in the unlocking direction. The first locking cam 120 connected to the same hinge shaft as the lever 110 is also pivoted in the unlocking direction together with the lever 110.

Here, when the first locking cam 120 is pivoted in the unlocking direction, the pivot restraining pin 122 formed on the outer surface of the first locking end 121 of the first locking cam 120 moves along the pivot restraining slot 132 formed in the second locking end 131 of the second locking cam 130, thereby pushing the second locking cam 130 in the unlocking direction.

That is, when the first locking cam 120 pivots in the unlocking direction, the pivot restraining pin 122 moves to the top of the pivot restraining slot 132 to push the second locking cam 130 in the unlocking direction, thereby causing the second locking cam 130 also to pivot in the unlocking direction.

Subsequently, when the first locking cam 120 and the second locking cam 130 pivot in the unlocking direction, as illustrated in FIGS. 5 and 6, the first locking end 121 of the first locking cam 120 pushes the reclining end 142 of the locking link 140 in the unlocking direction, so that the locking link 140 pivots in the unlocking direction.

Here, both the first return spring 111 and the second return spring 134 are stretched in a tensile state, thereby having elastic restoring force.

Thus, as the locking link 140 pivots in the unlocking direction, as illustrated in FIG. 6, the second sector gear 141 of the locking link 140 is separated from the first sector gear 151 of the rear link 150, so that the respective sector gears 141 and 151 may be disengaged.

Afterwards, the rear link 150 pivots in a direction for tilting the seat cushion frame 12.

That is, as the engagement between the second sector gear 141 of the locking link 140 and the first sector gear 151 of the rear link 150 is released, the rear link 150 pivots in a direction for tilting the seat cushion frame 12 due to elastic restoring force of the spiral spring 160.

More specifically, as illustrated in FIG. 7, the rear link 150 pushes the rear portion of the seat cushion frame 12 while being pivoted to the position in which the rear link 150 is erected almost upright by elastic restoring force of the spiral spring 160, whereby the seat cushion frame 12 is tilted.

Here, the guide pin 12-1 of the seat cushion frame 12 guides the direction of tilting of the seat cushion frame 12 while moving from the bottom to the top of the guide slot 152 of the rear link 150.

Consequently, since the front end portion of the seat cushion frame 12 is connected to the front end portion of the seat rail 20 with the hinge 40, the front end portion of the seat cushion frame 12 pivots forward and downward about the hinge 40 and, at the same time, the rear end portion of the seat cushion frame 12 pivots forward and upward due to the upwardly-pushing force of the rear link 150. As a result, the seat cushion frame 12 may be arranged to be inclined downward at a predetermined tilting inclination from the rear end portion toward the front end portion.

As described above, when the seat cushion frame 12 is tilted, the seatback frame 14 connected to the seat cushion frame 12 pivots from a backwardly-inclined position to a vertically upright position or a slightly forwardly-inclined position.

As described above, the seat cushion frame 12 is tilt-arranged and the seatback frame 14 is placed in the vertically upright position or the slightly forwardly-inclined position, thereby enabling a wide entrance and exit passage for a third row of seats to be provided.

Figure 8:
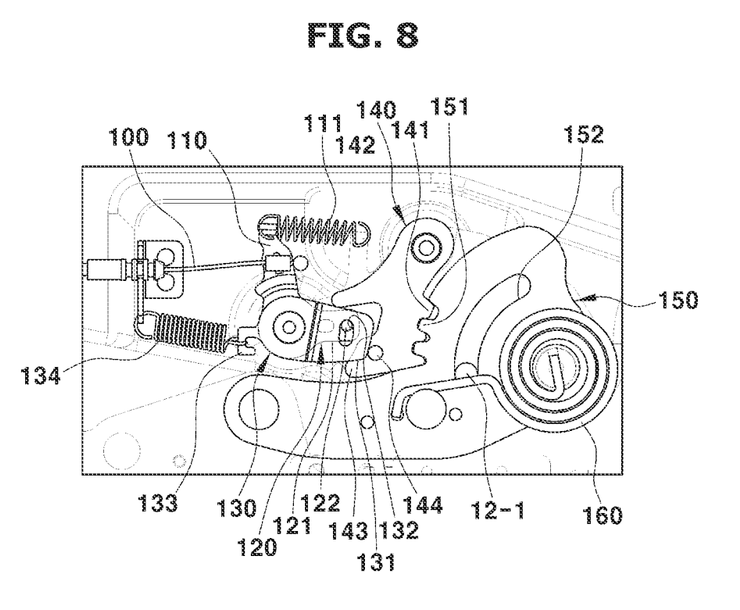
FIG. 8 is a side view illustrating a position in which the locked state of the locking device is maintained instead of being released even in the case that external force is transmitted to the walk-in seat locking device for a vehicle according to embodiments of the present disclosure.

FIG. 8 is a side view illustrating a position in which the locked state of the locking device is maintained instead of being released even in the case that external force is transmitted to the walk-in seat locking device for a vehicle according to embodiments of the present disclosure.

According to embodiments of the present disclosure, even in the case that external force including an impact from a rear-end collision is applied to the locking device of the walk-in seat 10, release of a locked state of the locking device may be prevented.

Even in the case that external force including an impact from a rear-end collision is transmitted to the first locking cam 120 to pivot the first locking cam 120 in the unlocking direction, as illustrated in FIG. 8, the pivot restraining pin 122 formed on the first locking end 121 of the first locking cam 120 moves from the bottom of the pivot restraining slot 132 formed on the second locking end 131 of the second locking cam 130 to be caught at the top of the pivot restraining slot 132. In this manner, rotation of the first locking cam 120 in the unlocking direction may be restrained.

In addition, even in the case that the first locking cam 120 is pivoted in the unlocking direction due to external force including an impact from a rear-end collision, pivoting of the second locking cam 130 in the unlocking direction is prevented due to elastic support and restoring force (i.e., force in the direction opposite to external force applied to pivot the second locking cam 130 in the unlocking direction) of the second return spring 134, since the second return spring 134 is connected to the spring hook 133 formed on the front portion of the second locking cam 130 and a predetermined position of the seat cushion frame 12.

Thus, even in the case that the first locking cam 120 is pivoted in the unlocking direction due to external force including an impact from a rear-end collision, as illustrated in FIG. 8, the second locking end 131 of the second locking cam 130 continues to restrain the locking link 140 while continuously contacting with the locking lug 144 formed on the outer surface of the locking link 140. Consequently, pivoting of the locking link 140 in the unlocking direction may be easily prevented, and thus, the engagement between the second sector gear 141 of the locking link 140 and the first sector gear 151 of the rear link 150 may be maintained.

As set forth above, even in the case that external force including an impact from a rear-end collision is applied to the walk-in seat locking device, release of the locked state of the locking device may be prevented. Accordingly, it is possible to prevent release of the locked state of the locking device due to external force including an impact from a rear-end collision from injuring a passenger seated in the walk-in seat 10.

Although embodiments of the present disclosure have been described in detail with reference to the exemplary embodiments as set forth above, the scope of the present disclosure is not limited to the foregoing embodiments. Rather, a variety of modifications and improvements are apparent to those skilled in the art without departing from the fundamental concept of the present disclosure defined by the appended claims, and such modifications and improvements shall be regarded as falling within the scope of the present disclosure.

What is claimed is:

1. A device comprising:
    a rear link comprising a first sector gear, the rear link having a first end portion hinge-fastened to a rear portion of a seat cushion frame and a second end portion hinge-fastened to a rear portion of a seat rail;
    a locking link comprising a second sector gear engageable with the first sector gear, wherein the second sector gear is on a rear portion of the locking link and is hinge-fastened to the seat cushion frame;
    a lever having a first end portion to which a cable is connected and a second end portion hinge-fastened to the seat cushion frame;
    a first locking cam having a first end portion coaxially connected to the lever, wherein a first locking end is on a second end portion of the first locking cam to restrain the locking link; and
    a second locking cam having a first end portion coaxially connected to the lever and the first locking cam, wherein a second locking end is on a second end portion of the second locking cam to restrain the locking link,
    wherein the locking link comprises a locking lug protruding from an outer surface thereof, and wherein the second locking end of the second locking cam is configured to contact the locking lug to push the locking link in a locking direction.

2. The device according to claim 1, wherein:
the first locking cam comprises a pin on the first locking end; and
the second locking cam comprises a slot in the second locking end, the slot being configured to receive the pin.

3. The device according to claim 1, wherein:
the rear link comprises a guide slot configured to guide a tilting route of the seat cushion frame; and
the seat cushion frame comprises a guide pin configured to be slidably inserted into the guide slot.

4. The device according to claim 1, further comprising a spiral spring having a first end portion connected to a predetermined position of the rear link and a second end portion connected to the seat cushion frame in order to provide an elastic restoring force to tilt the seat cushion frame with respect to the rear link.

5. The device according to claim 1, wherein:
the locking link comprises a reclining end protruding from a front intermediate portion thereof; and
the first locking end of the first locking cam is configured to contact the reclining end to pivot the locking link in an unlocking direction.

6. The device according to claim 5, wherein:
the locking link comprises a locking protrusion protruding from a front bottom end portion thereof; and
the first locking end of the first locking cam is configured to contact the locking protrusion to push the locking link in a locking direction.

7. The device according to claim 1, further comprising:
a spring hook on a front portion of the second locking cam; and
a return spring connected to the spring hook and a predetermined position of the seat cushion frame and configured to provide the second locking cam with an elastic restoring force in a locking direction.

8. The device according to claim 1, further comprising a return spring connected to an upper end portion of the lever and a predetermined position of the seat cushion frame and configured to provide the lever with an elastic restoring force in a locking direction.

9. The device according to claim 1, further comprising:
an actuator configured to be driven to pull the cable in an unlocking direction; and
a controller configured to apply a driving signal to the actuator in response to a manipulation of a switch.

10. A device comprising:
a rear link comprising a first sector gear, the rear link having a first end portion hinge-fastened to a rear portion of a seat cushion frame and a second end portion hinge-fastened to a rear portion of a seat rail;
a locking link comprising a second sector gear engageable with the first sector gear, wherein the second sector gear is on a rear portion of the locking link and is hinge-fastened to the seat cushion frame;
a lever having a first end portion to which a cable is connected and a second end portion hinge-fastened to the seat cushion frame;
a first locking cam having a first end portion coaxially connected to the lever, wherein a first locking end is on a second end portion of the first locking cam to restrain the locking link, and wherein the first locking cam comprises a pin on the first locking end; and
a second locking cam having a first end portion coaxially connected to the lever and the first locking cam, wherein a second locking end is on a second end portion of the second locking cam to restrain the locking link, wherein the second locking cam comprises a slot in the second locking end, the slot being configured to receive the pin, wherein the pin on the first locking end of the first locking cam and the slot in the second locking end of the second locking cam are configured to restrain pivoting of the first locking cam in an unlocking direction, and
wherein, in a state in which the first locking cam is pivoted in the unlocking direction by an external force, the pin on the first locking end of the first locking cam is configured to move from a bottom of the slot in the second locking end of the second locking cam to be caught at a top of the slot.

11. The device according to claim 10, wherein the external force comprises an impact from a rear-end collision.

12. The device according to claim 10, further comprising:
a spring hook on a front portion of the second locking cam; and
a return spring connected to the spring hook and a predetermined position of the seat cushion frame and configured to provide the second locking cam with an elastic restoring force in a locking direction.

13. The device according to claim 12, wherein, in a state in which the first locking cam is pivoted in the unlocking direction by an external force, the second locking cam is prevented from pivoting in the unlocking direction by the elastic restoring force of the return spring.

14. The device according to claim 10, wherein, in a state in which the first locking cam is pivoted in the unlocking direction by an external force, the second locking end of the second locking cam is configured to stay in continuous contact with a locking lug on an outer surface of the locking link to prevent the locking link from being unlocked.

15. A vehicle comprising:
a vehicle body comprising a floor panel;
a seat disposed in an interior of the vehicle, the seat comprising a seat cushion frame and a seat cushion;
a seat rail comprising a fixed rail mounted on the floor panel and a movable rail fastened to the fixed rail, wherein the fixed rail is configured to adjust a position of the seat in a forward-backward direction; and
a locking device for the seat, the locking device comprising:
a rear link comprising a first sector gear, the rear link having a first end portion hinge-fastened to a rear portion of the seat cushion frame and a second end portion hinge-fastened to a rear portion of the seat rail;
a locking link comprising a second sector gear engageable with the first sector gear, wherein the second sector gear is on a rear portion of the locking link and is hinge-fastened to the seat cushion frame;
a lever having a first end portion to which a cable is connected and a second end portion hinge-fastened to the seat cushion frame;
a first locking cam having a first end portion coaxially connected to the lever, wherein a first locking end is on a second end portion of the first locking cam to restrain the locking link; and
a second locking cam having a first end portion coaxially connected to the lever and the first locking cam, wherein a second locking end is on a second end portion of the second locking cam to restrain the locking link, wherein, in a state in which the first locking cam is pivoted in an unlocking direction by an external force, the second locking end of the second locking cam is configured to stay in continuous contact with a locking lug on an outer surface of the locking link to prevent the locking link from being unlocked.

16. The vehicle according to claim 15, wherein:

the first locking cam comprises a pin on the first locking end; and the second locking cam comprises a slot in the second locking end, the slot being configured to receive the pin.

17. The vehicle according to claim 15, wherein:

the rear link comprises a guide slot configured to guide a tilting route of the seat cushion frame; and the seat cushion frame comprises a guide pin configured to be slidably inserted into the guide slot.

18. The vehicle according to claim 15, further comprising a spiral spring having a first end portion connected to a predetermined position of the rear link and a second end portion connected to the seat cushion frame in order to provide an elastic restoring force to tilt the seat cushion frame with respect to the rear link.

* * * * *